(12) United States Patent
Kobayashi

(10) Patent No.: US 7,604,069 B1
(45) Date of Patent: Oct. 20, 2009

(54) DISC TILLER ROAD GRADER SYSTEM AND METHOD

(76) Inventor: Herbert S. Kobayashi, 1428 Nasa Pkwy., Webster, TX (US) 77598

( * ) Notice: Subject to any disclaimer, the term of this patent is extended or adjusted under 35 U.S.C. 154(b) by 0 days.

(21) Appl. No.: 11/869,893

(22) Filed: Oct. 10, 2007

(51) Int. Cl.
*E02F 3/00* (2006.01)
(52) U.S. Cl. .................... 172/784; 172/272
(58) Field of Classification Search ............ 172/780, 172/781, 784, 786, 787, 558, 236, 237, 272, 172/762
See application file for complete search history.

(56) References Cited

U.S. PATENT DOCUMENTS

| 98,647 | A | * | 1/1870 | Vairin | 172/579 |
| 823,872 | A | * | 6/1906 | Jones | 172/150 |
| 1,996,676 | A | * | 4/1935 | Hargrave | 172/558 |
| 2,036,598 | A | | 4/1936 | Miller et al | |
| 2,188,435 | A | * | 1/1940 | Hargrave | 172/784 |
| 4,106,645 | A | * | 8/1978 | Janish | 414/723 |
| 4,643,261 | A | * | 2/1987 | Long | 172/2 |
| 6,068,065 | A | * | 5/2000 | Mehew et al. | 172/785 |
| 6,293,354 | B1 | * | 9/2001 | Garratt et al. | 172/784 |

* cited by examiner

*Primary Examiner*—Robert E Pezzuto
*Assistant Examiner*—Matthew D Troutman
(74) *Attorney, Agent, or Firm*—Kenneth L. Nash

(57) ABSTRACT

Groundbreaking equipment utilizes a gang of discs and a road grader to provide a consistent depth of tilling without skipping areas of ground. In one embodiment, the road grader weighs ten to twenty tons, has articulating tandem rear wheels, front steering wheels, and hydraulic vertical and horizontal angle blade adjusters, whereby the disc tillers may be oriented in a manner for tilling at a desired depth and orientation, and the road grader features can be adjusted to counteract forces produced by the gang of discs. Mud scrapers are preferably provided for individual discs on an opposite side of the gang of discs with respect to the grader blade. In one embodiment, a hitch mechanism with stop surfaces is provided behind the grader blade for mounting and/or removal of the gang of discs to the grader blade within minutes without need of special tools.

8 Claims, 3 Drawing Sheets

DISC TILLER ROAD GRADER SYSTEM AND METHOD

BACKGROUND OF THE INVENTION

1. Field of the Invention

The present invention relates generally to tilling systems and, more particularly, to a disc tilling system for use with a road grader in a mariner that improves consistency of ground processing while significantly reducing time and energy requirements.

2. Description of the Background

Farm groundbreaking equipment, which may be pulled by tractors, such as plows and discs, may be utilized to turn the soil at an even depth to prepare the soil for new planting. One problem encountered during this process is jamming or clogging of the plows and/or discs. Each time the plows, disks, and/or chisel plows jam, clog, or fill-up with weeds, grass, clay, dirt, and/or old crops, the groundbreaking equipment must be lifted out of the ground. To complete the job of preparing the ground, the tractor and equipment must pass multiple times over the same areas until the soil is pulverized uniformly. The jamming and/or clogging results in very significant lost time and increased energy costs.

In more detail, most farm groundbreaking equipment utilizes staggered shanks that support plows or discs, which penetrate the soil. The pulling and/or pushing load is distributed over the shanks. The plows and discs are often staggered so that subsequent plows or discs turn the soil into the furrow dug by the previous plow or disc.

In some cases, the ground, grass, and/or crop may be processed before plowing utilizing discs. By using discs before plowing, the grass, crop, and/or weeds are less likely to become caught in the shanks of the plows. After the ground is plowed, the ground is often rough and contains clods or clumps. At this stage of groundbreaking, discs may be utilized to pulverize the ground and to chop the grass, crops, and weeds. Otherwise, the grass, crops, and/or weeds are likely to jam the plow. Prior art discs pulled by tractors can usually be pulled over the ground without jamming, depending on the design. However, the depth of ground penetration is difficult to control. The depth of ground penetration is determined by factors such as gauge wheels used with the discs, the weight of the discs, added weights, the angle of the discs, plant density, clay/liquid/sand content of the soil, bumps, and/or the like. If the gauge wheel falls into a disk for a row, the cutting depths may vary with the depth of the furrow.

As discussed above, one of the disadvantages of the plow is that grass, old crops, and/or weeds may easily jam the plow rendering further operation poor or limited. If the plow is attached to the tractor, the plow may be lifted hydraulically and may be cleaned by backing up. However, if the plow is dragged behind with a mechanical lift, the plow is usually cleaned by hand.

A gauge wheel may be attached to a gang of discs to be positioned in a disc furrow to counteract side forces operating on other discs. As noted above, this may cause a varying depth of penetration due to variations in depth of the disc furrow. The forces acting on discs may be countered by the pulling hitch, the gauge wheels, the weight of the discs, and the angle of the disc gang. However, if the ground is hard, the disc force can be greater than the force provided by the hitch and gauge wheel causing the disc to follow a straight line and the gauge wheels to slide sideways whereby the disc do not cut into the ground. This causes the ground to be broken up at an uneven depth, and may leave weeds, grass, and/or old crops standing. To correct this skipping problem, the ground must be processed with the discs repeatedly. A disc tiller may have sets of discs that are oriented in different directions so that the cutting force in one direction is countered by each other.

In summary, using prior groundbreaking equipment, it is often necessary to pull the equipment over various parts of the field multiple times before a consistently desired farming surface is created. With a large field, the additional time required can be extensive.

U.S. Pat. No. 2,036,598, issued Apr. 7, 1936, to J. G. Miller et al., discloses a disc tiller unit clamped to the front of a grader blade. While the patent indicates the device is suitable for tilling roads, it is believed that the device is unsuitable for use in tilling fields for several reasons. For one reason, it is believed that tilling a typical farm field rather than a road will cause a rapid buildup of grass, weeds, old crops, mud, and/or other debris between the grader blade and the disc unit, which would prevent operation, and repeatedly require extensive cleaning. Thus, jamming and clogging is likely to be extensive in this design. This would appear to be very time consuming, perhaps to the point of making the device essentially unusable for the farming purposes. Thus, in many fields, this device is likely to have the same or much worse jamming or clogging problems than other prior art tillers and plows. Another problem relates to the clamping mechanism for securing the disc tiller to the grader blade, which is complicated and would appear to be time consuming, and may possibly damage the grader blade.

Consequently, there remains a long felt need for an improved tilling system that is not subject to the jamming or clogging problems of prior art tilling systems. Those skilled in the art have long sought and will appreciate the present invention, which addresses these and other problems.

SUMMARY OF THE INVENTION

It is an object of the present invention to provide an improved tilling system.

It is another object of the present invention to provide a tilling system that is less likely to become jammed or clogged in fields with grass, weeds, old crops, mud and/or clay.

It is another object of the present invention to provide a tilling system that may be used for rapidly tilling a field with an acceptably consistent tilling depth.

These and other objects, features, and advantages of the present invention will become apparent from the drawings, the descriptions given herein, and the appended claims. However, it will be understood that above-listed objectives and/or advantages of the invention are intended only as an aid in quickly understanding aspects of the invention, are not intended to limit the invention in any way, and therefore do not form a comprehensive or restrictive list of objectives, and/or features, and/or advantages.

Accordingly, in one possible embodiment, the present invention provides groundbreaking equipment, which may comprise a plurality of elements, such as, for example, a gang of discs comprised of a plurality of rotatable discs for breaking the ground and a road grader with a road grader blade. A hitch mechanism may be positioned between the rear surface of the road grader blade and the gang of discs. The hitch mechanism is preferably operable for removable mounting of the gang of discs behind the front surface of the grader blade. In this assembly configuration, discharge from the gang of discs is behind the road grader blade when the road grader moves forward for preventing jamming of the discharge between the gang of discs and the front surface of the road grader.

In one embodiment, the groundbreaking equipment may further comprise a plurality of mud scrapers for the gang of discs. Preferably, the mud scrapers are positioned on an opposite side of the gang of discs with respect to the rear surface of the grader blade.

In another embodiment of the present invention, the hitch mechanism may comprise a disc hitch portion secured to the gang of discs, and a mating blade hitch portion secured with respect to the rear surface. The disc hitch portion and the blade hitch portion may then be connected together.

As one possibility for construction of the hitch mechanism, a first weld may be utilized to secure the disc hitch portion to the gang of discs, and a second weld may be utilized to secure the blade hitch portion with respect to the rear surface of the grader blade. In one embodiment, the hitch mechanism may comprise a hook defined in at least one of the disc hitch portions and the blade hitch portion. The hitch mechanism might further comprise a pin connection offset from the hook connection, whereby the hook connection and the pin connection in combination affix the disc hitch portion to the blade hitch portion.

The present invention also comprises a method for making groundbreaking equipment comprising one or more steps such as, for example, providing a gang of discs and a road grader. Other steps may comprise forming a hitch mechanism in between the rear surface of the road grader blade and the gang of discs for removable mounting of the gang of discs behind the front surface of the road grader blade. In this configuration, discharge from the gang of discs is behind the road grader blade when the road grader moves forward. This configuration prevents jamming due to discharge between the gang of discs and the front surface of the road grader.

The groundbreaking equipment may comprise a hook and pin configuration where the pin is insertable into said hook. A second fastener may be provided at an offset position from said hook. Stop surfaces may be provided on the hitch portions, which when engaged, align openings for the second fastener to permit quick insertion of the fastener into the openings.

While the present invention will be described in connection with presently preferred embodiments, it will be understood that it is not intended to limit the invention to those embodiments. On the contrary, it is intended to cover all alternatives, modifications, and equivalents included within the spirit of the invention and as defined in the appended claims.

DETAILED DESCRIPTION OF THE PREFERRED EMBODIMENTS

The present invention provides a system and method for tilling the land for farming, which results in breaking the ground to an even depth without jamming or clogging the groundbreaking equipment. The result is not only improved groundbreaking, but also a significant savings of time and energy. The present invention involves a new way to attach a disc tiller to a road grader without damaging the road grader blade and without affecting the use of the road grader after detaching. In one embodiment, relatively minor modifications are made to the disc tiller and road grader whereby a hitching mechanism is provided that allows a disc tiller to be quickly secured to the road grader blade, and also removed within seconds, without need of any special equipment.

The costs to provide groundbreaking equipment in accord with the present invention are well within a farm equipment budget. If a road grader is obtained second hand, one who is familiar with second hand markets for farm equipment might expect the price to be less than about five to ten thousand dollars, in 2007 dollars. In one embodiment, for reasons described hereinafter, selection will be made for a road grader with articulating rear tandem wheels and for hydraulic actuators for angular adjustment of the blade relative to the plane of the ground. Even with these features, the cost may not be particularly more, and may be less than the cost of a tractor for use with a disc tiller.

Figure 1:
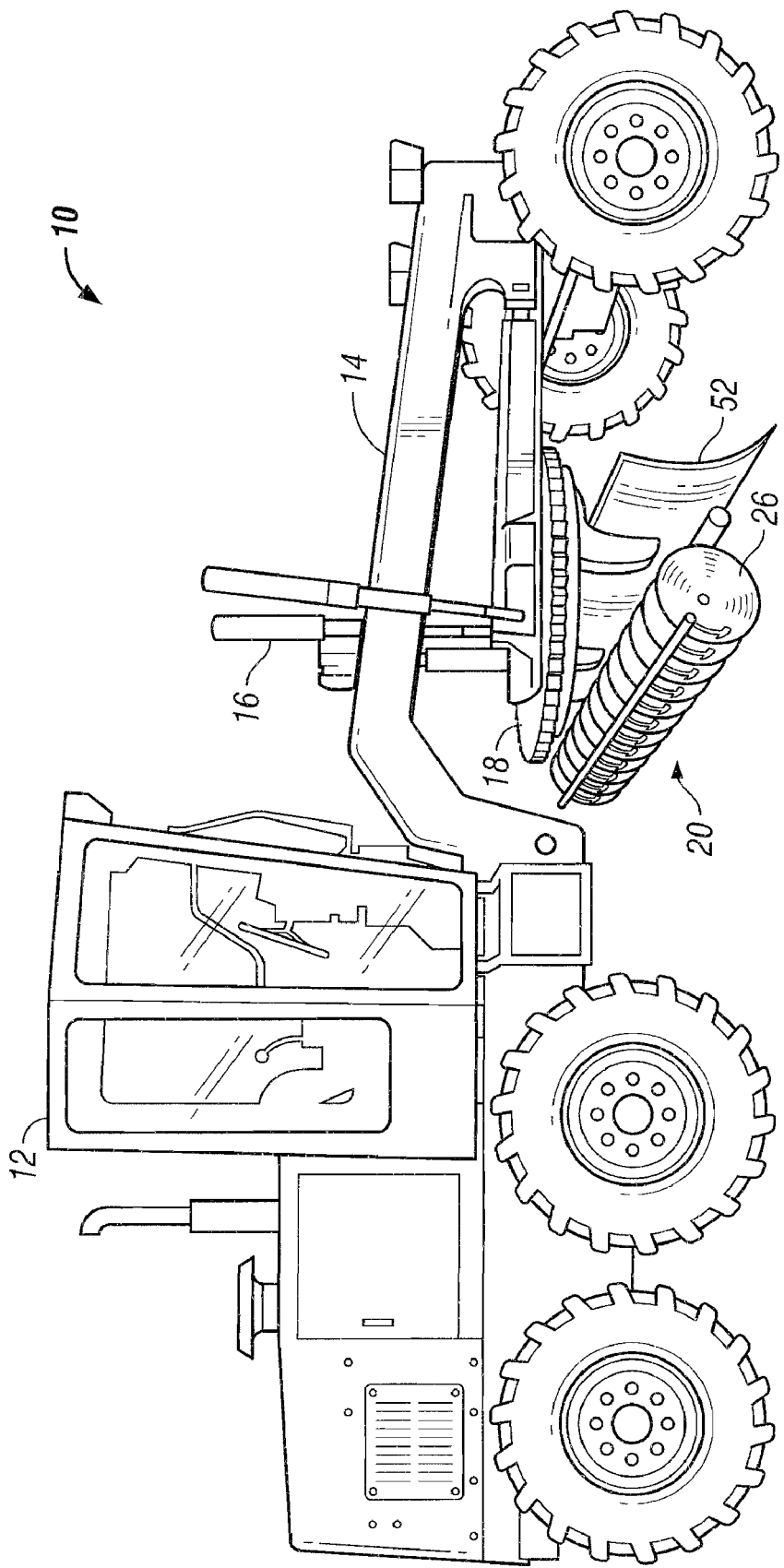
FIG. 1 is a perspective side view of a disc tiller secured to the rear of a grader blade in accord with one possible embodiment of the present invention.
Figure 2:
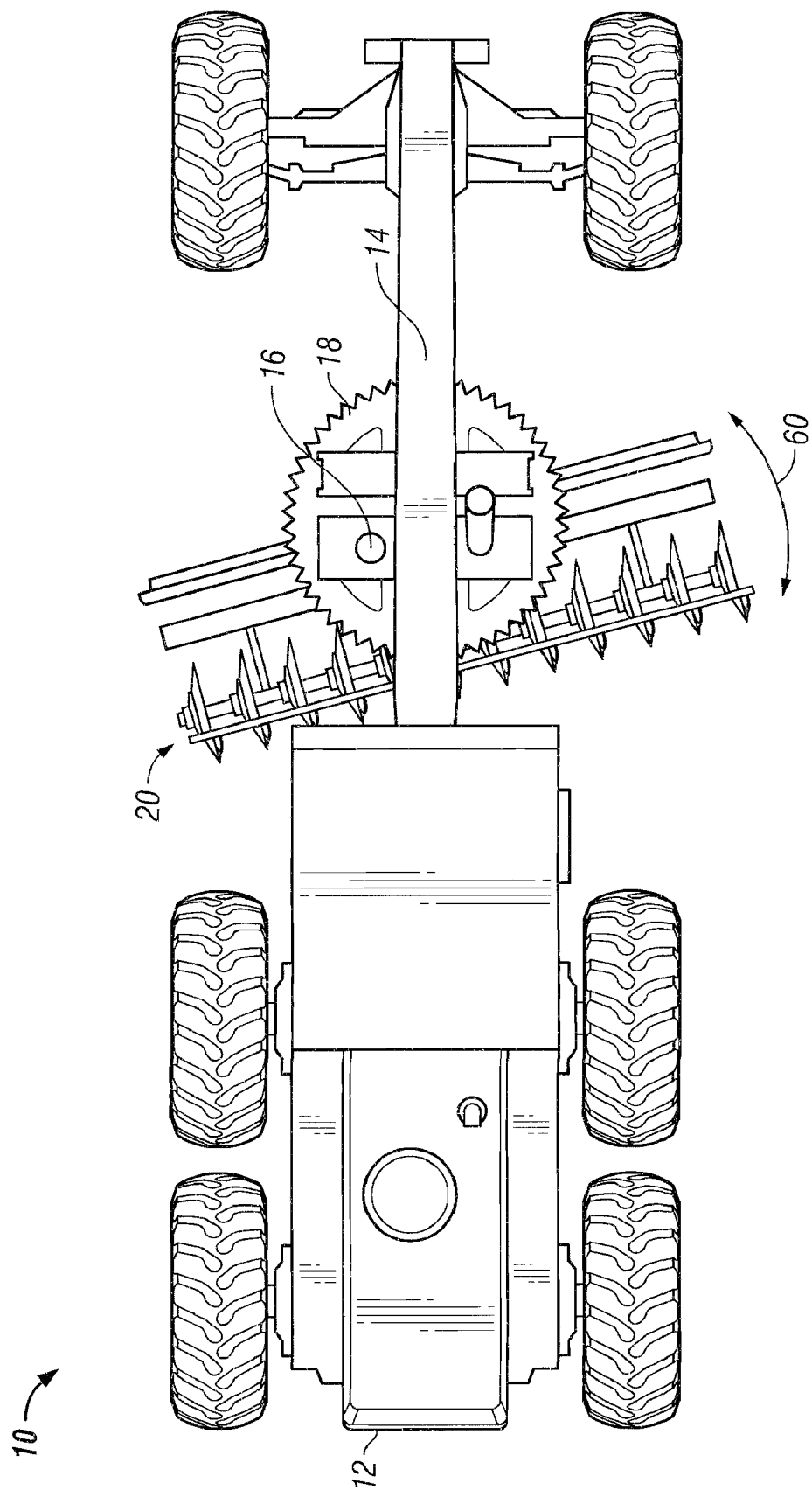
FIG. 2 is a top view of a disc tiller secured to the rear of a grader blade in accord with one possible embodiment of the present invention.

Referring now to the drawings and, more particularly to FIGS. 1 and 2, there is shown an overview of one possible embodiment of a disc tiller road grader 10 in accord with the present invention. Road grader 12 normally comprises a grader blade support beam 14 that connects between the cab and the front wheels, and which supports grader blade 52. In one possible embodiment, hydraulic actuators 16 may be provided of various configurations to control the vertical position of grader blade 52; in other words, to move the grader blade 52 up and down and/or to provide for angular orientation of the grader blade with respect to the ground. Utilizing this feature in conjunction with articulating tandem rear wheels, the forces acting on disc tiller 20 can be counteracted.

Grader blade 52 is typically supported by means for rotation of the blade, such as rotary table 18. Grader blade supports 42, shown in FIG. 3, may then attach to rotary table 18. Rotary table 18 may rotate in either direction. Hydraulic actuators 16 may be configured to provide vertical up and down adjustment on the right side and left side of the rotary table to allow a wide range of orientation of grader blade 52 and gang of discs 20, which is attached thereto as discussed hereinafter.

Figure 3:
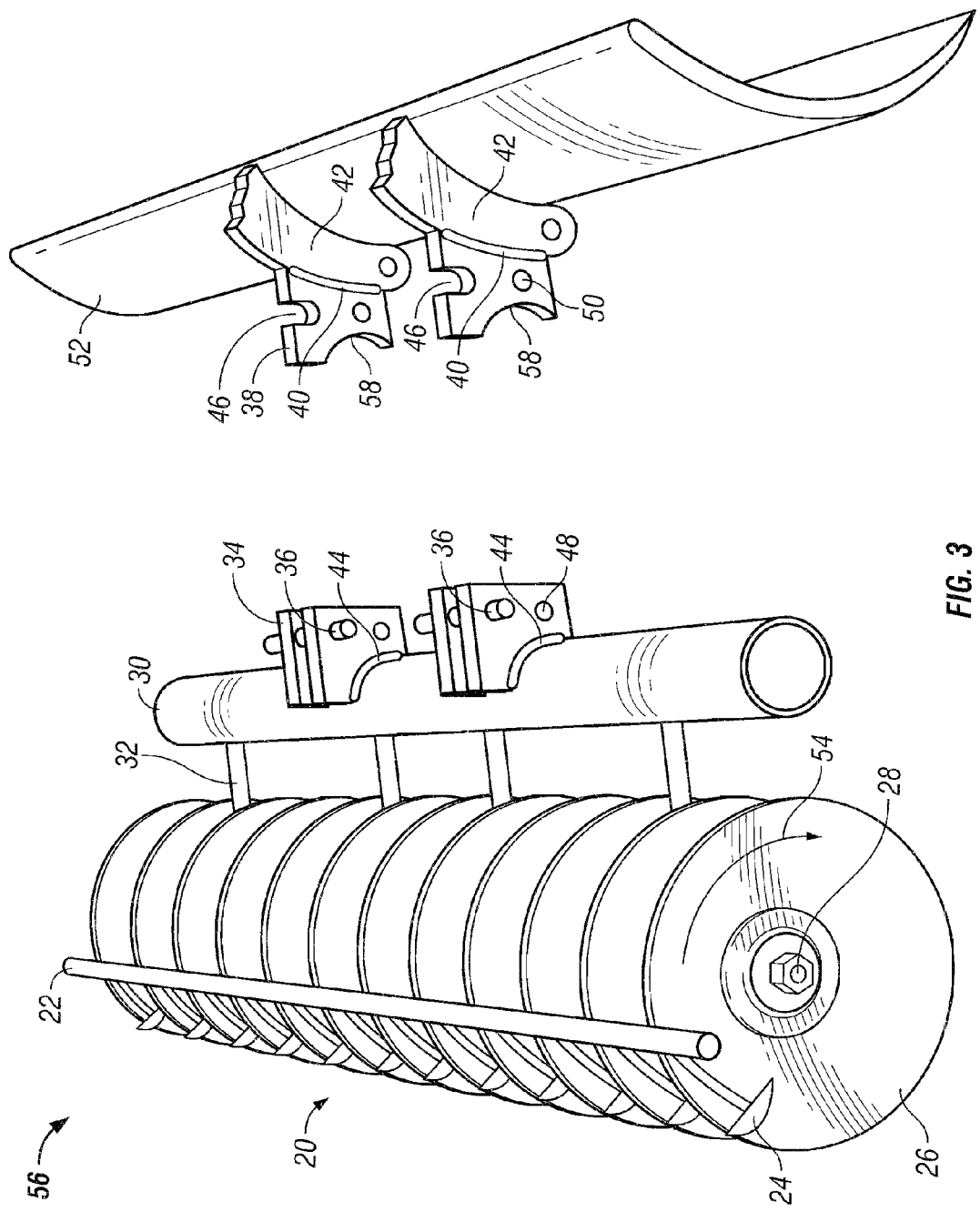
FIG. 3 is a perspective view of an easy mount hitch for securing a disc tiller to a grader blade in accord with one possible embodiment of the present invention.

From review of FIGS. 1-3, it will be seen that gang of discs 20 is secured to grader blade 52 and may be moved upward and downward and rotated in conjunction with movement of grader blade 52. Thus, gang of discs 20 can be positioned with the vertical depth and angular position as desired in the soil to be tilled.

Gang of discs 20 may be mounted such that the bottom of gang of discs 20 extends below the bottom of grader blade 52 by some desired amount, which may be greater than the anticipated depth to which the gang of discs is intended to be inserted in the soil. In one embodiment, gang of discs 20 may be positioned approximately six inches below the bottom of grader blade 52. Accordingly, grader blade 52 does not need to contact the ground during operation of gang of discs 20. However, grader blade 52 may still level some mounds or bumps that extend substantially above the surface. In another possible embodiment, gang of discs 20 may be positioned from three to twelve inches below the bottom of grader blade 52. In other embodiments, gang of discs 20 may be mounted at a distance outside of the above-provided ranges.

When utilizing a standard disc tiller, it may be desirable to remove some components prior to installation onto a grader blade in accord with the present invention. Such components to remove may include the hitch, any tail wheels, any side wheel, and any front wheel. Components preferably retained for use in the present invention from a standard disc tiller may include discs 26, scrapers 24, bearings (not shown), disc frame components 30 and 32, and axle 28. Alternatively, the present invention may utilize original components that are originally designed, built, and intended for usage as per an embodiment of the present invention. Road grader 12 is modified as disclosed below.

Referring now to FIG. 3, gang of discs 20 rotate on axle 28. In one embodiment, mud scrapers 24 may be mounted on mud scrapper support 22 to remove mud, grass, weeds, old crops, and the like from each disc 26 as the disc rotates. The mud scrapers may be mounted such that any mud or debris picked up by the disc will encounter the mud scraper during the initial movement of that portion of the disc as it exits the ground. The typical direction of rotation of the discs is indicated by 54. The discharge of debris is behind grader blade 52 when road grader 12 moves forward, and therefore the debris is prevented from building up on the front surface of grader blade 52, which otherwise would result in jamming, clogging, and general malfunction.

Gang of discs 20 may be held together utilizing a support frame, which may comprise disc support bar 30 and disc support elements 32. Gang of discs 20 may comprise a larger or smaller number of discs than shown in the present embodiment. Other types of frames for gang of discs 20 may also be utilized with the present invention, and the particular frame shown here is for reference only. Support bar 30 might also be a pipe or bar that is added to a gang of discs.

One possible embodiment for hitch mechanism 56 is shown in FIG. 3. Hitch mechanism 56 comprises disc hitch portion 34 and the mating grader blade hitch portion 38. Other hitch mechanisms might also be utilized to provide a means for removeably securing gang of discs 20 to grader blade 52.

In this embodiment, two identical spaced apart disc hitch portions 34 may be welded or otherwise secured to a portion of the support frame for a gang of discs 20, such as weld 44 to disk support bar 30. Likewise, two identical grader blade hitch portions 38 may be welded, bolted, or otherwise mounted to grader blade support members 42. In one possible visual example, welds may be utilized, such as weld 40. In this embodiment, two disc hitch portions 34 and two mating grader blade hitch portions 38 may be utilized. However, additional blade hitch portions 34 and mating grader blade hitch portions 38 might also be utilized, and the hitch portions may be configured differently than as shown. Moreover, if the width of blade hitch portion 34 and grader blade hitch portion 38 is increased, then only one set of hitch portions might be utilized.

In this embodiment, fasteners which might be pins, may be inserted into holes 36 of disc hitch portions 34. These pins then mate with hook or slot 46. Pins may also be utilized in holes 58 of disc hitch portions 34 and corresponding holes 50 in grader blade hitch portions 38. In this embodiment, disc hitch portions 34 may utilize two walls or plates between which a hook-shaped wall or plate of grader blade hitch portions 38 is inserted and fastened.

In one embodiment, stop surfaces may be provided so that lifting grader blade 52 causes pivoting of disc hitch portions 34 at a pivot point, created by the pins through top holes 34 that engage slots 46. The stop surfaces may be used to conveniently align holes 48 and 50 automatically. For instance, stop surfaces 58 may be formed on grader blade hitch portions 38 that engage disc support bar 30, whereby when holes 48 and 50 are aligned and pins may be inserted into these holes for locking gang of discs 20 onto road grader 12.

In this case, stop surfaces 58 are rounded to mate to the rounded surface of disc support bar 30, but this configuration of stop surfaces is not required. As well, stop surfaces 58 could be formed on the ends or other parts of disc hitch portion 38. As another possibility, stop surfaces 58 could be added elsewhere than on the respective hitch portions. As another possibility, stop surfaces may not be utilized and hydraulic tilting controls may be provided to pivot the hitch portions until holes 48 and 50 align, or the like. As another possibility, a spring-loaded latch may be utilized on the hitch portions for securing them together. The above limitations are intended to be illustrative of various examples, but are not to be construed as limiting to these examples for possible hitch components and/or configurations.

To attach gang of discs 20 to road grader 12, pins are inserted into upper holes 36. These pins may be permanently positioned in these holes, if desired, such as by welding. Road grader 12 can then be utilized to make the attachment by lowering grader blade 52 and moving slots 46 in grader blade hitch portions 38 underneath the pins in holes 36 of disc hitch portions 34.

Once slots 46 and pins of holes 36 are aligned, grader blade 52 may be lifted. Due to stop surfaces 58, holes 48 and 50 are automatically aligned, whereby pins may be inserted into holes 48 and 50. For alignment of holes 48 and 50, grader blade 12 may be lifted causing the stop surfaces 58 to engage disc support bar 30, whereby holes 48 and 50 are then aligned for insertion of the pins. The actual hitching process, once the hitch portions are aligned, will take only seconds.

Once connected to the grader blade with hitch mechanism 56, gang of discs 20 is mounted at an offset distance with respect to a rear surface of grader blade 52. The offset distance will be dependent on the particular configuration of hitching mechanism 56, and may typically be about one to two feet. However, gang of discs may be mounted at an offset distance further or less than this amount. Generally, the offset distance to the rear will be limited by the need to provide clearance with the rear wheels.

To detach gang of discs 20 from road grader 12, the process is essentially the reverse, and takes less time because no alignment of road grader with gang of discs 20 is required. Grader blade 52 is lifted, whereby the stop surfaces mate, and pins through holes 48 and 50 are easily removed. Grader blade 12 is lowered and unhooked whereby movement of grader blade 12 results in slots 46 being lowered and moved away from pins through upper holes 36. Alternatively, grader blade 12 could be lowered to a point to remove tension off pins through upper holes 48 and 50 whereby the pins may be removed.

During operation, disc tiller road grader 10 may be utilized to loosen the ground to a uniform depth in the first pass without the need for overlapping the area. The time required for this process may be about thirty percent of the time normally required when using a similar disc tiller pulled by a tractor. The weight of a typical road grader 12 is approximately ten to twenty tons. Accordingly, the downward force acting that is available for placement on gang of discs 20 is much greater than is normally available when pulling a disc tiller with a tractor. When pulling a disc tiller with a tractor, weight may be added, but generally the total weight available is around three thousand pounds. Moreover, in the present invention, the downward weight is supported by support beam 14 so that in soft mud, the disc tiller does not sink further than the desired depth of processing of the ground. The result is very consistent tilling without skipping areas of ground. The tilling job may be completed in about one-third the time as compared to a tractor pulled disc tiller. Additionally, the job is completed with higher quality ground preparation in a much shorter period of time. The use of disc tiller road grader 10 with high potential weight applied to gang of discs 20 eliminates skipping caused by jamming, choking, clogging due to weeds, grass, old crops, clay, mud and the like. Thus, disc tiller road grader 10 prepares the ground for planting in considerably less time, at less cost, and using less energy.

Road graders are typically about twenty feet long and about eight feet wide. In one possible embodiment, road grader 10 may have articulating rear tandem wheels that may be utilized to offset forces produced during tilling. During operation, the angle of grader blade 52 can be changed as indicated by arrow 60 to change the angular orientation of gang of disc tillers 20 to the most suitable groundbreaking position. Road graders may typically be able to rotate grader blade 52 by 360 degrees. Thus, gang of disc tillers 20 may be oriented in ways not practical when using a tractor. Road grader 12 may also provide for front wheel steering which can be used to counter the disc side forces created during operation.

Other general configurations of the present invention are also possible. For example, additional components may be added. Thus, additional tools may be added to perform multiple functions simultaneously such as busting ground, planting, harrowing, leveling, moving dirt, mowing, and/or other functions. Another practical advantage of use of a road grader over a tractor for pulling a disc tiller is that the road grader turns in a smaller radius. During operation, the operator may be looking forward much more often rather than having to look to the rear to check disc tiller operation for skipping, and the like.

It is also to be understood that the foregoing descriptions of preferred embodiments of the invention have been presented for purposes of illustration and explanation and it is not intended to limit the invention to the precise forms disclosed. It is to be appreciated therefore that various structural and method changes, many of which are suggested herein, may be made by those skilled in the art without departing from the spirit of the invention.

What is claimed is:

1. Groundbreaking equipment for breaking ground, comprising:
    a gang of discs, said gang of discs comprising a plurality of rotatable discs for breaking said ground;
    a road grader comprising a road grader blade, said road grader blade comprising a front surface and a rear surface behind said front surface; and
    a hitch mechanism positioned between said rear surface of said road grader blade and said gang of discs and being operable for removably mounting said gang of discs behind said front surface of said grader blade, whereby discharge from said gang of discs is behind said road grader blade when said road grader moves forward or preventing jamming of said discharge between said gang of discs and said rear surface of said road grader;
    a hook connection for said hitch mechanism comprising a first body, said first body defining a receptacle, said receptacle comprising an opening and a support surface, said first body further defining a first socket, said first socket being spaced apart from said receptacle in said first body;
    a second body for said hitch mechanism, said second body defining a second socket;
    a first pin secured to said second body, said first pin being receivable through said opening and engageable with said support surface of said receptacle, whereby when engaged with said support surface said first pin being pivotal with respect to said receptacle to thereby permit pivotal movement of said gang of discs with respect to said grader blade, whereby said second socket is pivotally moveable with respect to said hook connection after said first pin engages said support surface, and whereby said pivotal movement of said gang of discs with respect to said grader blade permits alignment said first socket and said second socket;
    stop surfaces positioned to engage and thereby limit said pivotal movement of said gang of discs with respect to said grader blade when said first socket and said second socket are aligned; and
    a second pin insertable through said first socket and said second socket when said first socket and said second socket are aligned to thereby prevent said pivotal movement of said gang of discs with respect to said grader blade and affixes said gang of discs to said grader blade, said first socket and said second socket being positioned below said receptacle when said first socket and said second socket are aligned;
    a disc support bar rotatable mounted to said gang of discs utilizing one or more support elements, at least one of said first body or said second body being mounted to said disc support bar, said at least one of said first body or said second body comprising a height smaller than a height of said gang of discs whereby when said first body and said second body are disconnected from each other and said disc support bar engages the ground then said one or more support elements are angled with respect to the ground.

2. The groundbreaking equipment of claim 1, further comprising a plurality of mud scrapers for said gang of discs positioned on an opposite side of said gang of discs with respect to said rear surface of said grader blade.

3. The groundbreaking equipment of claim 1, further comprising a first weld to secure said second body and said gang of discs, and a second weld to secure said first body in a fixed position with respect to said rear surface of said grader blade, whereby when said gang of discs is secured to said grader blade, then said gang of discs moves in concert with movement of said grader blade.

4. The groundbreaking equipment of claim 1, wherein said road grader comprises a weight between 10 and 20 tons, said road grader comprises articulating tandem rear wheels for countering thrust produced by said gang of discs.

5. A method for making groundbreaking equipment for breaking ground, comprising:
    utilizing a gang of discs comprising a plurality of rotatable discs for breaking said ground;
    utilizing a road grader comprising a road grader blade, said road grader blade comprising a front surface and a rear surface behind said front surface of said road grader blade, said road grader weighing between 10 and 20 tons; and
    utilizing a hitch mechanism between said rear surface of said road grader blade and said gang of discs for removeably mounting said gang of discs behind said front surface of said road grader blade and adjacent said rear surface of said road grader blade, whereby discharge from said gang of discs is behind said road grader blade when said road grader moves forward for preventing jamming of said discharge between said gang of discs and said rear surface of said road grader;
    utilizing a first body for said hitch mechanism such that said first body defines a receptacle, said receptacle comprising an opening at one end and a support surface at a lower end, said first body further defining a first socket, said first socket being spaced apart from said receptacle in said first body;

utilizing a second body for said hitch mechanism such that said second body defines a second socket;

utilizing a first pin secured to said second body such that that said first pin is receivable through said opening and engageable with said support surface of said receptacle of said first body, whereby when engaged with said support surface said first pin is pivotal with respect to said receptacle to thereby permit pivotal movement of said gang of discs with respect to said grader blade, whereby said second socket is pivotally moveable with respect to said first body after said first pin engages said support surface, and whereby said pivotal movement of said gang of discs with respect to said grader blade permits alignment of said first socket and said second socket;

providing stop surfaces positioned to engage and prevent said pivotal movement of said gang of discs with respect to said grader blade whereby said first socket and said second socket are aligned; and providing a second pin insertable through said first socket and said second socket when said first socket and said second socket are aligned to thereby prevent said pivotal movement of said gang of discs with respect to said grader blade, said first socket being positioned below said receptacle when said first socket and said second socket are aligned.

6. The method of claim 5, further providing that a plurality of mud scrapers for said gang of discs are positioned on an opposite side of said gang of discs with respect to said rear surface of said grader blade.

7. The method of claim 5, further comprising affixing said second member with respect to said gang of discs by welding, and affixing said first member with respect to said rear surface of said grader blade by welding or bolting.

8. The method of claim 6, further comprising providing that said road grader comprises articulating rear tandem wheels, front wheel steering, and hydraulic adjusters to adjust an angular orientation between said blade and a surface plane of said ground.

* * * * *

UNITED STATES PATENT AND TRADEMARK OFFICE
CERTIFICATE OF CORRECTION

| | | |
|---|---|---|
| PATENT NO. | : 7,604,069 B1 | Page 1 of 1 |
| APPLICATION NO. | : 11/869893 | |
| DATED | : October 20, 2009 | |
| INVENTOR(S) | : Herbert S. Kobayashi | |

It is certified that error appears in the above-identified patent and that said Letters Patent is hereby corrected as shown below:

Column 8, Line 20, Claim 1, delete "rotatable" and replace with --rotatably--.

Column 9, Line 6, Claim 5, delete "that".

Signed and Sealed this

Twenty-second Day of December, 2009

David J. Kappos
*Director of the United States Patent and Trademark Office*